June 2, 1959
E. M. HOFF
2,889,172
DUMPING TRAILER
Filed May 9, 1956
2 Sheets-Sheet 1
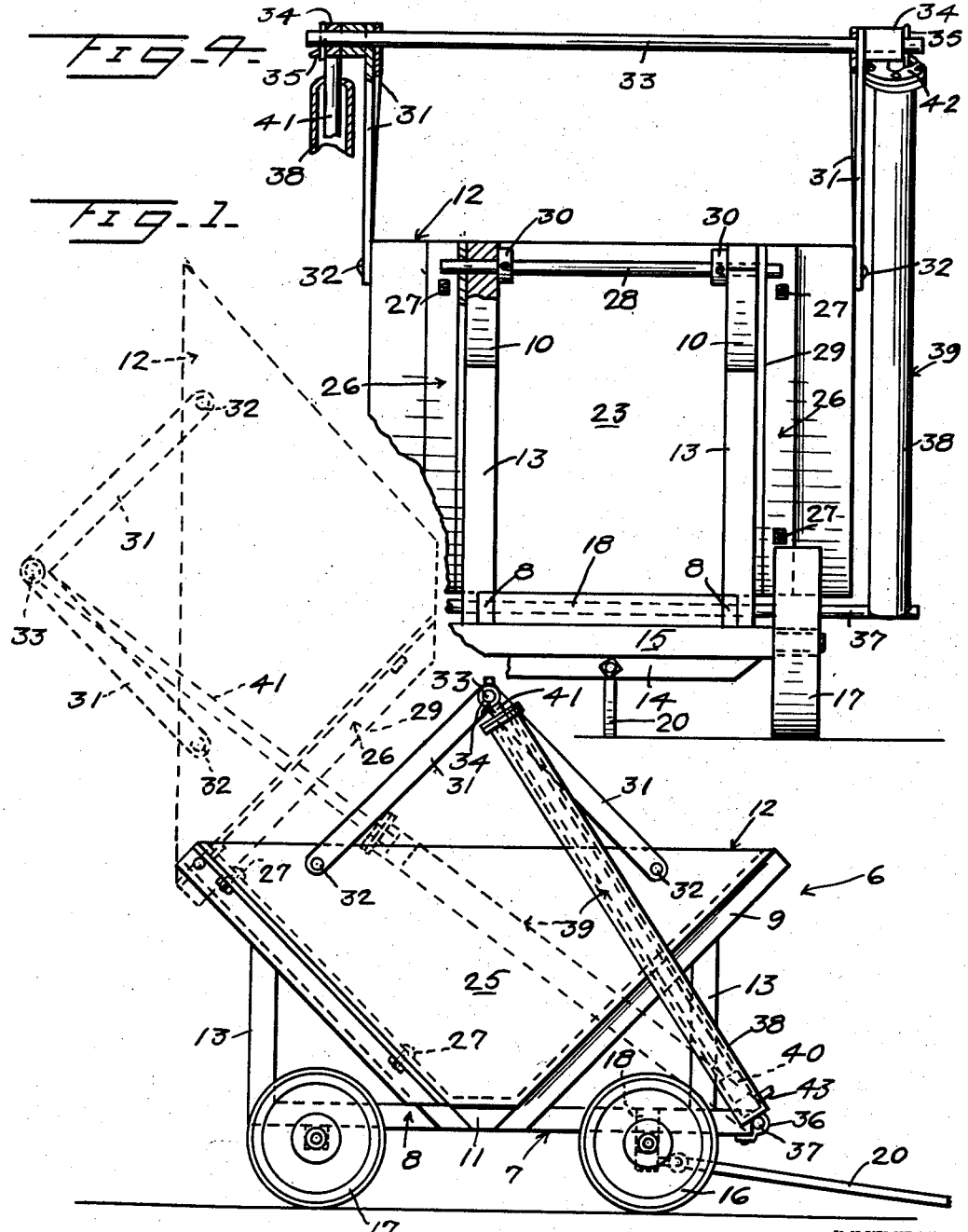
INVENTOR
Emil M. Hoff
BY John N. Randolph
ATTORNEY

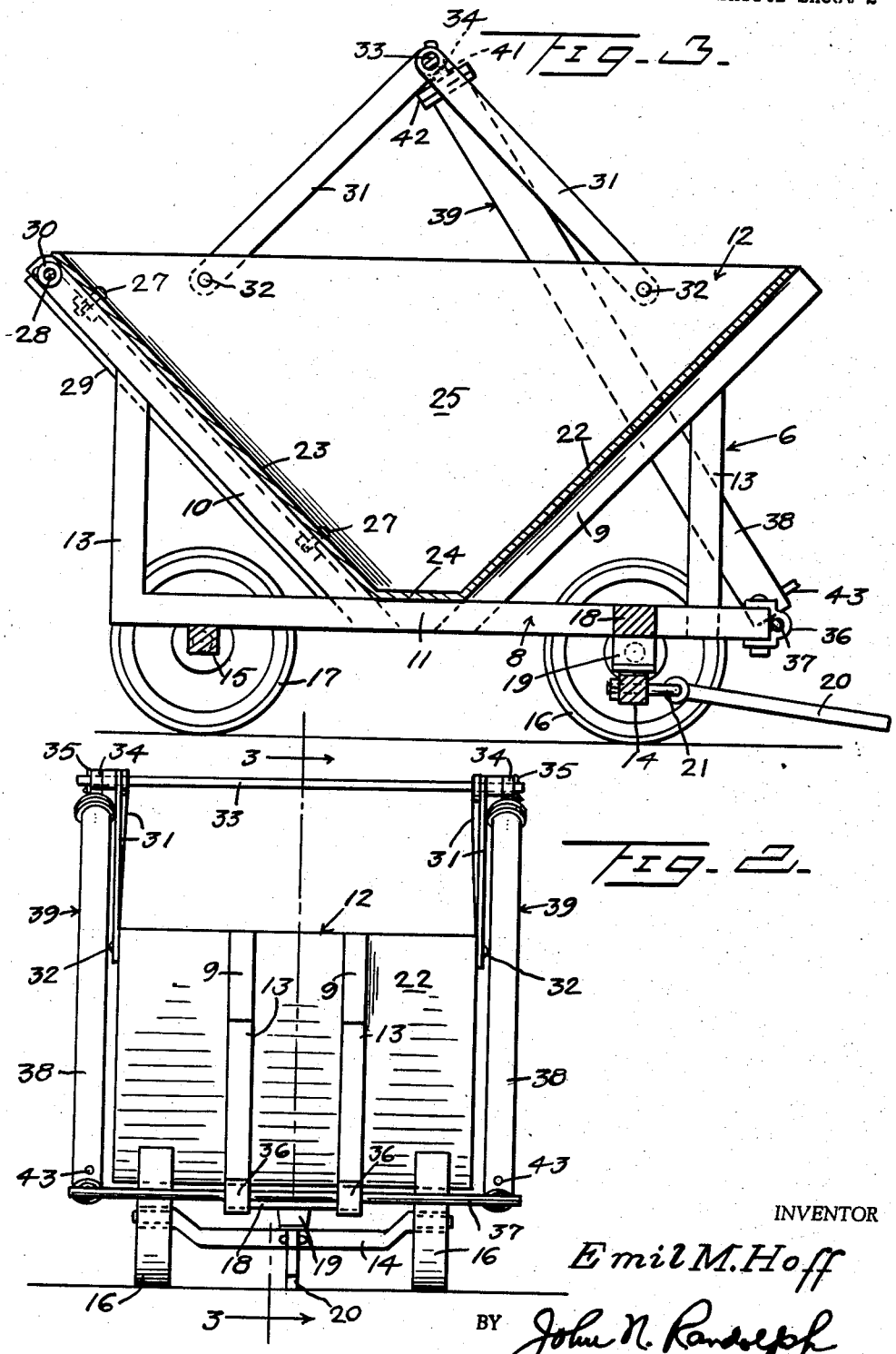

United States Patent Office 2,889,172
Patented June 2, 1959.

2,889,172

DUMPING TRAILER

Emil M. Hoff, Richardton, N. Dak.

Application May 9, 1956, Serial No. 583,821

2 Claims. (Cl. 298—10)

This invention relates to a novel vehicle with a dump body and is primarily adapted to be used as a silage wagon to be drawn behind a silage field cutter and into which the silage is discharged from the cutter.

The primary object of the present invention is to provide a vehicle of the aforedescribed character for conveying silage, grain and feed and having a dump body which can be readily raised for discharging the load therefrom by gravity directly into a truck.

Another object of the invention is to provide a vehicle having a novel tilting and linkage assembly connected to the chassis and dump body of the vehicle, to effect swinging movement of the dump body to and from load supporting and dumping positions.

A further object of the invention is to provide a vehicle of the aforedescribed character of extremely simple construction which may be economically manufactured and sold and which will be extremely efficient and durable in use.

Various other objects and advantages of the invention will hereinafter become more fully apparent from the following description of the drawings, illustrating a presently preferred embodiment thereof, and wherein:

Figure 1 is a side elevational view of the vehicle;

Figure 2 is an end elevational view thereof, looking from right to left of Figure 1 toward the forward end of the vehicle;

Figure 3 is an enlarged longitudinal sectional view, taken substantially along a plane as indicated by the line 3—3 of Figure 2, and Figure 4 is a fragmentary rear elevational view, partly in vertical section, thereof.

Referring more specifically to the drawings, the vehicle in its entirety and comprising the invention is designated generally 6 and is illustrated as a trailer type vehicle or wagon. The vehicle 6 includes a frame, designated generally 7, including a pair of transversely spaced sill members 8 which extend longitudinally of the vehicle. The frame 7 also includes front and rear pairs of inclined braces 9 and 10, respectively, having lower ends which are rigidly secured to the sills 8. The front and rear frame members 9 and 10 extend upwardly in diverging relation to one another, said front frame members 9 extending upwardly and forwardly and said rear frame members 10 extending upwardly and rearwardly from the sills 8. The frame members 9 and 10 combine with the intermediate portions 11 of the sills 8, which are disposed therebetween, as seen in Figures 1 and 3, to form a cradle-like bed for receiving and supporting the dump body or box, designated generally 12. Said front and rear frame members constituting end portions of the bed. The frame 6 also includes upright braces 13 which extend upwardly from the sills 8, adjacent the ends thereof, and which have upper ends which are disposed under and secured to the frame members 9 and 10, near to but spaced from the upper ends of said frame members.

The frame 6 is supported by a front axle 14 and a rear axle 15, which axles are in turn supported by a pair of front wheels 16 and a pair of rear wheels 17. The sills 8 preferably rest directly upon the rear axle 15. A crossbeam 18 extends between and is secured to the sills 8, near to but spaced from their forward ends. The crossbeam 18 has a depending supporting element 19 which is disposed between the intermediate portion of the cross beam 18 and the intermediate portion of the front axle 14. A tongue 20 is connected at its rear end by a connection 21 to the front axle 14 and extends forwardly therefrom. The tongue 20 is attached by the connection 21 for vertical swinging movement relative to the axle 14. The front wheels 16 constitute the steerable wheels of the vehicle 6.

The body or box 12 includes downwardly and inwardly inclined front and rear walls 22 and 23, respectively, a substantially flat bottom portion 24 and substantially parallel side walls 25. The walls 22 and 23 normally rest against the bed members 9 and 10 and the bottom 24 normally rests upon the sill portions 11, as best seen in Figure 3. As best seen in Figure 4, a pair of angle members 26 is secured to the outer side of the rear wall 23 by suitable fastenings 27. The angle members 26 are spaced apart a distance relative to one another to straddle the rear bed members 10. A shaft 28 extends through the upper portions of the bed members 10 and loosely through the upper portions of the flanges 29 of the angle members 26, which flanges are disposed perpendicular to the rear wall 23, for pivotally connecting the body or box 12 at its rear end to the bed members 10. Collars 30 may be detachably secured to the shaft 28 between and in engagement with the bed members 10, for retaining the shaft ends in engagement with the flanges 29.

The width of the box 12, as measured between its side walls 25, is greater than the width of the frame 7, as seen in Figures 2 and 4. A pair of links 31 is connected to each side wall 25 near the upper edge thereof by fastenings 32. The links 31 of each pair of links extend upwardly in converging relation to one another and have overlapping upper ends. A rod 33 extends through the overlapping upper ends of the four links 31. Sleeve members 34 are journaled on the end portions of the rod 33 outwardly with respect to the links 31, and are retained thereon in any suitable manner as by means of cotter pins 35 which extend through the rod ends.

Sleeve members 36 are fastened to the forward end of the sills 8 for supporting a rod 37 which extends therethrough and outwardly therefrom. The closed lower ends of a pair of hydraulic cylinders 38 are connected to the end portions of the rod 37 and extend upwardly and rearwardly therefrom. The cylinders 38 may be fixed to the rod 37 and said rod may be journaled in the members 36, or the lower ends of the cylinders 38 may be turnably connected to the rod ends and the rod 37 may be secured immovably in the members 36. The cylinders 38 constitute portions of hydraulic rams 39 each of which includes a piston 40 which is slidably mounted in the cylinder 38 thereof and a piston rod 41. The piston rods 41 extend upwardly through the cylinders 38 from the pistons 40 and slidably through the upper cylinder ends 42 and are secured at their upper extremities to the sleeves 34. An end of a conduit 43 opens into each cylinder 38 near its lower end. The conduits 43 lead from a suitable source of a hydraulic medium under pressure, not shown.

The dump body or box 12 while in its normal position as seen in full lines in Figure 1 and in Figures 2, 3 and 4 is adapted to be filled through the open top thereof. The vehicle 6 is adapted to be drawn by the tongue 20 which may be coupled to a silage cutter for drawing the vehicle 6 behind the cutter and so that the cut silage can be discharged directly into the box 12. When the box 12 is filled, the lower ends of the cylinders 38 receive a hydraulic medium under pressure for extending the hydraulic rams 39 to their dotted line positions of Figure 1. As the rams 39 are thus extended, the box 12 pivots about the shaft 28 swinging counterclockwise as seen in Figure 1 through an arc of approximately 90° to its dotted line position in which all of the load contained in the box 12 will be discharged by gravity over the rear wall 23. It will be apparent that the contents of the box 12 will commence to discharge therefrom almost as soon as the box commences its swinging movement counterclockwise from its full line to its dotted line position of Figure 1, if the box is fully loaded, so that the weight of the box and its contents will diminish as the box is swung toward its dotted line dumping position. The open top of the box is preferably disposed about eight feet above the level of the bottom portions of the wheels 16 and 17, so that the load contained in the box may be discharged directly into a truck. After the box 12 is empty the pressure can be released from the cylinders 38 gradually and the box 12 will swing by gravity clockwise back to its full line position of Figure 1 in the bed 9, 10 and 11.

The bed members 9 and 10 support and brace the box walls 22 and 23, respectively, and the box bottom 24 is braced by the sill portions 11 so that the box 12 can be constructed of a relatively light gauge material and will still be capable of supporting a considerable load. The vehicle 6 may be made in various sizes and is preferably constructed to support a load of about three tons.

Various modifications and changes are contemplated and may be resorted to without departing from the function or scope of the invention as hereinafter defined by the appended claims.

I claim as my invention:

1. In a vehicle, a chassis including an elongated chassis frame and a bed having end portions extending upwardly and outwardly from an intermediate portion of the chassis frame, an elongated open top box shaped to seat in said bed including end walls resting against said end portions of the bed, pivot means connecting an end portion of the box, adjacent the open top thereof, to an upper end of one of the end portions of the bed, a rigid link having one end connected to the box adjacent the open top of the box and spaced from the pivot means and an opposite end rigidly disposed above the box and nearer said pivot means, and an extensible tilting means having one end pivotally connected to the chassis frame and spaced from the pivot means and an opposite end located nearer said pivot means and pivotally connected to the last mentioned end of said rigid link.

2. In a vehicle, a chassis including an elongated chassis frame and a bed having end portions extending upwardly and outwardly from an intermediate portion of the chassis frame, an elongated open top box shaped to seat in said bed including end walls resting against said end portions of the bed, pivot means connecting an end portion of the box, adjacent the open top thereof, to an upper end of one of the end portions of the bed, a pair of rigid links each having an end connected to the box at points spaced longitudinally of the box, said links extending upwardly from the box in converging relation to one another and having overlapping opposite ends disposed above the box and spaced from the box ends, and an extensible tilting means having one end pivotally connected to the chassis frame and spaced from said pivot means and an opposite end located nearer said pivot means and pivotally connected to the overlapping ends of said rigid links.

References Cited in the file of this patent

UNITED STATES PATENTS

| | | |
|---|---|---|
| 301,437 | Egerton | July 1, 1884 |
| 1,997,000 | Lamb | Apr. 9, 1935 |
| 2,194,068 | Eisenberg | Mar. 19, 1940 |
| 2,286,416 | Hulmstrom | June 16, 1942 |
| 2,313,514 | Brooks | Mar. 9, 1943 |
| 2,427,132 | Godbey | Sept. 9, 1947 |
| 2,672,247 | Jewett | Mar. 16, 1954 |
| 2,752,193 | Kling | Jan. 26, 1956 |

FOREIGN PATENTS

| | | |
|---|---|---|
| 70,137 | Denmark | Oct. 24, 1949 |
| 483,299 | Italy | July 23, 1953 |
| 101,423 | Sweden | Apr. 22, 1941 |